United States Patent [19]

Lindeen

[11] Patent Number: 4,759,270
[45] Date of Patent: Jul. 26, 1988

[54] VENT CAP COVER

[75] Inventor: John R. Lindeen, Odessa, Fla.

[73] Assignee: Jack Lindeen Company, Inc., Odessa, Fla.

[21] Appl. No.: 115,830

[22] Filed: Nov. 2, 1987

[51] Int. Cl.[4] .............................................. B60H 1/26
[52] U.S. Cl. .................................... 98/2.14; 98/42.19;
403/408.1; 411/107; 411/999
[58] Field of Search .............. 98/2.14, 2.18, 27, 42.14,
98/42.19; 248/237, 200; 403/377, 408.1;
411/103, 107, 105, 999

[56] References Cited

U.S. PATENT DOCUMENTS

| 727,019 | 5/1903 | Stewart | 411/93 |
| 1,606,410 | 11/1926 | Frame | 98/2.14 |
| 2,172,939 | 9/1939 | Lintern et al. | 98/2.14 |
| 3,085,490 | 4/1963 | Field | 98/42.14 X |
| 4,026,971 | 5/1977 | Glasoe | 98/2.14 X |
| 4,196,657 | 4/1980 | Crongeyer et al. | 98/2.14 |

FOREIGN PATENT DOCUMENTS 2613666 10/1977 Fed. Rep. of Germany ....... 98/2.14

Primary Examiner—Harold Joyce
Attorney, Agent, or Firm—A. W. Fisher, III

[57] ABSTRACT

A vent cap cover for use with the ventilation assembly of a motor home, travel trailer or the like comprising a hollow enclosure including a plurality of vent louvers formed therein affixed to the motor home, travel trailer or the like by a plurality of vent cap cover brackets to operatively house the ventilation assembly to permit the vent cap of the ventilation assembly to remain open while preventing rain and insects from entering the interior of the motor home, travel trailer or the like through the vent port of the ventilation assembly.

8 Claims, 1 Drawing Sheet

VENT CAP COVER

BACKGROUND OF THE INVENTION

1. Field of the Invention

A vent cap cover for use with the ventilation assembly of a motor home, travel trailer and the like to permit the vent cap to remain open, while preventing rain and insects from entering the interior of the motor home, travel trailer and the like through the vent port of the ventilation assembly.

2. Description of the Prior Art

Motor homes, recreational vehicles and the like are generally provided with ports and watertight covers. Such covers may be opened permitting air flow through the port for ventilation. These covers are often configured to prevent entry of rain and insects through the port while open.

U.S. Pat. No. 2,550,353 discloses a vehicle ventilation unit comprising a casing including an air inlet and an air outlet. When the vehicle is in motion air enters the casing through the air inlet. A proportion of the air passes through an opening into the interior of the vehicle. The remainder of the air flows passes out through the air outlet.

U.S. Pat. No. 2,294,363 shows a vehicle body comprising a pair of body sides, a floor, an upwardly arched top including an inner top plate and an outer top plate and a plurality of laterally extending rafters to support the top. The rafters are spaced longitudinally of the top to define an air cell between each adjacent pair of rafters. The combination of a longitudinally extending structural member disposed adjacent the junction between the top and the body side and form a part of the body side. The member is arched downwardly to define a passageway between the member and the top. A means communicates between each of the cells and the passageway; an orifice in the member communicating between the passageway and the interior of the body. An opening in the outer top plate permitting air to circulate from the interior of the body through the orifice, passageway, cell and opening to the exterior of the body.

U.S. Pat. No. 4,038,911 discloses a multi-directional vent for the ventilation opening of a vehicle including a vent frame having a vent cover pivoted at its front side to the frame and having an air intake opening in the front of the vent cover. A door is pivoted to the vent cover to selectively close or open the vent cover intake opening. With the door and vent cover open ventilation is provided in all directions when the vehicle is at rest and when in motion a venturi effect is achieved to extract air from the interior of the vehicle.

U.S. Pat. No. 4,592,269 shows a static vent for a vehicle to continuously vent the interior thereof to the atmosphere in such a way as to prevent the ingress of rain water to the vehicle compartment.

U.S. Pat. No. 3,919,927 discloses a ventilator fixture including a pair of half domes arranged back to back with each half dome having an open screened face.

U.S. Pat. No. 3,738,621 relates to a rooftop evaporative cooler to cool the interior of vehicles whether moving or stationary. The cooler includes a rear-facing streamlined housing disposed over a rooftop register. The forward surface of the housing slopes inwardly from the vehicle roof to a horizontal rear portion adjacent a rear-opening, louvered entrance port. A suction fan is disposed within the housing to draw air into the housing through an evaporative pad and expel cooled air into the vehicle.

U.S. Pat. No. 4,615,263 shows a vent to ventilate motor homes, travel trailers or the like, while blocking entrance of rain and small animals through a ventilation duct. The vent includes a pair of opposed water-blocking sidewalls interconnected by a front structure comprising a pair of spaced apart louvres that define an inwardly, upwardly directed air passing channel.

U.S. Pat. Nos. 2,839,986 and 2,939,375 disclose ventilators for use with non-porous structures such as tents; while U.S. Pat. No. 2,711,126 shows a ventilating skylight.

SUMMARY OF THE INVENTION

The present invention relates to a vent cap cover for use with the ventilation assembly of a motor home, travel trailer or the like to permit the vent cap of the ventilation assembly to remain open while preventing rain and insects from entering the interior of the motor home, travel trailer or the like through the vent port of the ventilation assembly.

The vent cap cover comprises a hollow enclosure affixed to the motor home, travel trailer or the like by plurality of vent cap cover brackets to operatively house the ventilator assembly.

The hollow enclosure of the vent cap cover includes a plurality of vent louvers to receive air therethrough and a peripheral attachment flange including a plurality of bracket apertures to receive a plurality of vent cap cover fasteners as described more fully hereinafter to affix the vent cap cover to the motor home, travel trailer, or the like.

Each vent cap cover bracket comprises a bracket member including a first element having an oblong slot formed therethrough and a second raised offset element including a channel formed therethrough to receive a corresponding plurality of vent fasteners and vent cap cover fasteners respectively.

To install the vent cap cover, a plurality of vent fasteners are removed from on each side of the ventilator assembly. The plurality of vent cap cover fasteners are then inserted upwardly through the corresponding channels. The vent cap cover brackets are set in place and fastened about the periphery of the vent port by the plurality of vent fasteners passing downwardly through the corresponding plurality of oblong slots.

The hollow enclosure is then placed over the vent port such that the vent cap cover fasteners pass through the corresponding bracket apertures and secured in place by a corresponding plurality of nuts or similar securing devices.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
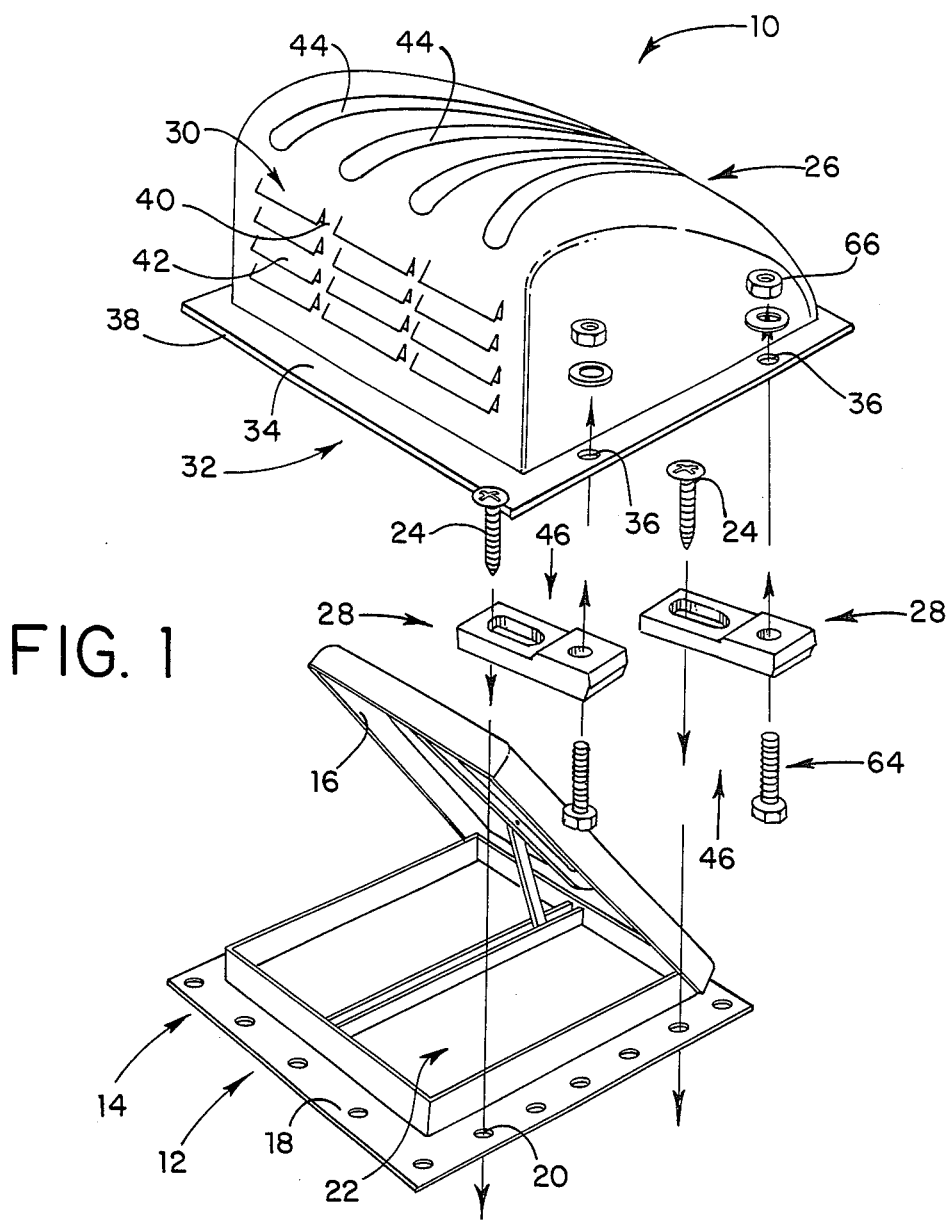
FIG. 1 is an exploded perspective view of the vent cap cover and ventilation assembly.

As shown in FIG. 1, the present invention relates to a vent cap cover generally indicated as 10 for use in combination with a ventilation assembly generally indicated as 12 of a motor home, travel trailer or the like.

As shown in FIG. 1, the ventilation assembly 12 comprises a vent port generally indicated as 14 having a vent cap 16 movable between an open and closed position disposed relative thereto to selectively close or seal the vent port 14. The vent port 14 comprises a vent flange 18 having a plurality of vent flange apertures 20 formed therethrough and a centrally disposed vent opening 22 formed therein. The vent port 14 is secured to the motor home, travel trailer or the like by a plurality of vent port fasteners each indicated as 24 passing through the corresponding plurality of vent flange apertures 20.

As shown in FIG. 1, the vent cap cover 10 comprises a hollow enclosure generally indicated as 26 affixed to the motor home, travel trailer or the like by a plurality of vent cap cover brackets each generally indicated as 28.

As shown in FIG. 1, the hollow enclosure 26 of the vent cap cover 10 has a plurality of vent louvers each generally indicated as 30 formed therein to permit air to pass therethrough and the vent port 14 into the interior of the motor home, travel trailer or the like. A peripheral attachment flange generally indicated as 32 is formed about the lower periphery of the hollow enclosure 26. The peripheral attachment flange 32 comprises a substantially horizontal element 34 including a plurality of bracket apertures each indicated as 36 formed therethrough and a substantially vertical spacer element 38 extending downward about the peripheral edge of the substantially horizontal element 34.

As shown in FIG. 1, each vent louver 30 comprises an air ventilation slot 40 shrouded by a corresponding protective cover 42 to shield each air ventilation slot 40 from rain. A screen or similar medium (not shown) is affixed to the interior of the hollow enclosure 26 adjacent the air ventilation slots 40 to prevent insects and the like from entering the vent cap cover 10 through the air ventilation slots 40.

As shown in FIG. 1, the hollow enclosure 26 of the vent cap cover 10 further includes a plurality of ridges each indicated as 44 to strengthen the hollow enclosure 26 and improve aerodynamic stability.

Figure 2:
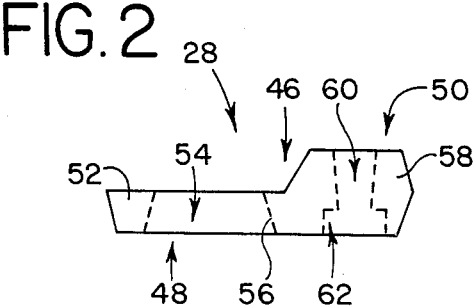
FIG. 2 is a side view of the vent cap cover bracket.
Figure 3:
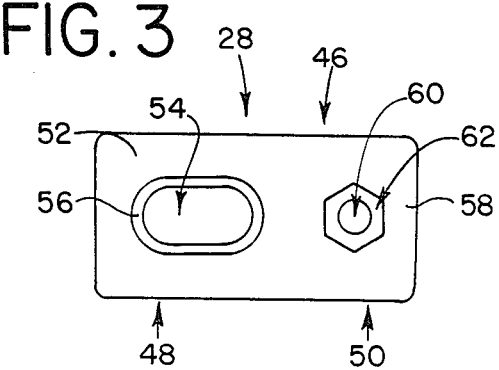
FIG. 3 is a bottom view of the vent cap cover bracket.

As best in FIGS. 2 and 3, each vent cap cover bracket 28 comprises a bracket member generally indicated as 46 including an inner and outer bracket element generally indicated as 48 and 50 respectively. The inner bracket element 48 includes a substantially flat element 52 having an oblong slot 54 with inclined interior side wall 56 formed therethrough, while the outer bracket element 50 comprises a raised offset member 58 including a channel 60 formed therethrough having countersunk recess 62 formed on the lower portion thereof.

To install the vent cap cover 10, a plurality of the vent fasteners are removed from on each side of the ventilator assembly 12. A plurality of vent cap cover fasteners each indicated as 64 are then inserted upwardly through the corresponding channels 60 and countersunk recesses 62. The vent cap cover brackets 28 are set in place and fastened about the vent flange 18 by the plurality of vent port fasteners 24 passing downwardly through the corresponding plurality of oblong slots 54 and vent flange apertures 20 into the motor home, travel trailer or the like.

The hollow enclosure 26 is then placed over the vent port 14 such that the vent cap cover fasteners 64 pass through the corresponding bracket apertures 36 and secured in place by a corresponding plurality of nuts 66 or similar securing devices.

The oblong slots 54 allow adjustment of the vent cap cover brackets 28 to accommodate vent ports 14 of various sizes. Since the channels 60 are spaced outwardly from corresponding oblong slots 54, the substantially horizontal element 34 covers the vent flange apertures 20 preventing liquid flow therethrough.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A vent cap cover for use with a ventilation assembly of a motor home, travel trailer or the like to permit a vent cap of the ventilation assembly to remain open while preventing rain and insects from entering the interior of the motor home, travel trailer or the like through the port of the ventilation assembly, said vent cap cover comprises a hollow enclosure including a plurality of vent louvers formed therein affixed to the motor home, travel trailer or the like by a plurality of vent cap cover brackets to operatively contain the ventilation assembly, said hollow enclosure having a peripherial attachment flange formed about the lower periphery thereof, said peripherial attachment flange having a plurality of bracket apertures formed therethrough to receive a corresponding plurality of vent fasteners and each said vent cap cover bracket comprises a bracket member having a slot formed through the inner portion thereof and a channel formed through the outer portion thereof to receive said corresponding plurality of vent fasteners and a corresponding plurality of vent cap cover fasteners respectively therethrough to secure said vent cap cover brackets to said ventilation assembly and said hollow enclosure to said vent cap cover brackets.

2. The vent cap cover of claim 1 wherein said peripheral attachment flange comprises a substantially horizontal element having said bracket apertures formed therethrough and a substantially vertical spacer element extending downward from the peripheral edge of said substantially horizontal element.

3. The vent cap cover of claim 2 wherein each said bracket member comprises an inner bracket element having said slot formed therethrough and an outer bracket element having said channel formed therethrough.

4. The vent cap cover of claim 3 wherein said outer bracket element comprises a raised offset member.

5. The vent cap cover of claim 4 wherein the inner surface of each said slot includes inclined surface.

6. The vent cap cover of claim 5 wherein each said channel includes a recess formed in the lower portion thereof.

7. The vent cap cover of claim 1 further including ridges formed on the upper surface of said hollow enclosure.

8. The vent cap cover of claim 1 wherein each said vent louver comprises an air ventilation slot shrouded by a protective cover.

* * * * *